United States Patent [19]

Borel et al.

[11] E Re. 28,891

[45] Reissued July 6, 1976

[54] LIQUID CRYSTAL DISPLAY DEVICE

[75] Inventors: Joseph Borel, Echirolles; Jacques Robert, St. Egreve, both of France

[73] Assignee: Commissariat a l'Energie Atomique, Paris, France

[22] Filed: June 25, 1974

[21] Appl. No.: 483,028

Related U.S. Patent Documents

Reissue of:

[64] Patent No.: 3,716,290
Issued: Feb. 13, 1973
Appl. No.: 190,178
Filed: Oct. 18, 1971

[52] U.S. Cl. ..... 350/160 LC
[51] Int. Cl.[2] ..... G02F 1/16
[58] Field of Search ..... 360/160 LC

[56] References Cited

UNITED STATES PATENTS 3,505,804 4/1970 Hofstein ..... 350/160 LC X
3,603,984 9/1971 Heilmeier et al. ..... 340/378 R
3,781,087 12/1973 Nagasaki ..... 350/160 LC

*Primary Examiner*—Edward S. Bauer
*Attorney, Agent, or Firm*—Cameron, Kerkam, Sutton, Stowell & Stowell

[57] ABSTRACT

An electrooptical display device comprising a film of liquid crystals between two systems of electrodes. One system comprises a plurality of integrated circuits forming a supporting layer on a substrate and a plurality of flat metallic electrodes deposited on the supporting layer, each electrode being connected electrically to one circuit. The other system comprises a transparent insulating plate provided on one face with a uniform coating of electrically conductive and semi-transparent material.

2 Claims, 4 Drawing Figures

LIQUID CRYSTAL DISPLAY DEVICE

Matter enclosed in heavy brackets [ ] appears in the original patent but forms no part of this reissue specification; matter printed in italics indicates the additions made by reissue.

This invention is concerned with an electrooptical device which makes use of liquid crystals and finds an application in the development of display devices such as those which are employed in the display of alphanumeric characters.

It is known that electrooptical display devices can be fabricated by making use of certain liquid crystals, especially those of the nematic type. The phenomenon which is usually employed is a phenomenon orientation and the historical background of this phenomenon will now be given in brief outline in order that the properties and advantages of this invention may thus be more readily understood.

Liquid crystals are substances which, within certain ranges of temperature, exist in an intermediate state between the crystalline form which is characteristic of some solids and the disordered form which is characteristic of the liquid state. Three classes of liquid crystals are distinguished, namely nematic, semectic and chloesteric. For reasons of simplification, consideration will be given in the following description only to the nematic liquid crystals although the invention is clearly not limited to this class alone.

In a nematic crystal, the molecules are of highly elongated shape and possess an electric dipole moment at right angles to the axis of the molecule. When a material of this type is placed between two metallic electrodes to which no voltage is applied, the different molecules of the liquid are aligned in parallel relation within small zones which are referred-to as domains. The different domains are not oriented parallel to each other, with the result that a partial disorder remains. When a voltage is applied to the electrodes of a unit of this type, the liquid crystal which is located between these electrodes is subjected to an electric field. The different molecules of the crystal are oriented within this electric field and the different domains which were not oriented in a zero electric field are accordingly aligned. In consequence, the molecules of the crystal are oriented parallel to the metallic plates of the device. In this state of excitation, the liquid crystal therefore exhibits a highly ordered structure which is close to that found in the usual crystals. However, the presence of electrodes which are under tension and in contact with the liquid induces an electron current and an ion current within the liquid. The production of ions within the liquid crystal results in imperfections within the crystal lattice. These imperfections cause diffusion of light. The degree of diffusion exhibited by the liquid crystal depends on the applied electric field. When voltage is no longer applied to the electrodes of the device, the electric field within the crystal again becomes zero and the electron and ion currents are no longer induced; the different domains become randomly oriented, with the result that the liquid-crystal film again becomes transparent. The time of appearance of the diffusion phenomenon depends on the liquid crystal which is employed and on the electric field which is applied but is typically of the order of 1 millisecond; the time taken by the liquid crystal to revert to its transparent state after electrical excitation has been discontinued is of the order of a few tens of milliseconds.

The modification of the optical properties of a liquid-crystal film when an electric field is applied is used in display devices for indicating signs and in particular alphanumeric characters. In a very general manner, a display device of the nematic liquid crystal type is therefore provided in the form of two systems of electrodes between which is interposed a thin film of liquid crystal. This system is associated on the one hand with electronic means for excitation of certain zones of the device and on the other hand with an auxiliary light source which illuminates the device.

The liquid-crystal display devices in accordance with the prior art contain two systems of electrodes which are fabricated as follows: semi-transparent and parallel metallic strips are deposited on a transparent substrate such as a glass plate. The width of said strips is very small and may be a fraction of a millimeter, for example. The spacing between the strips is approximately a few hundred angstroms. The array of conductive strips of one of the electrode systems is placed at right angles to the array of conductive strips of the other electrode system and in oppositely-facing relation to this latter. The film of liquid crystals is placed between these two electrode systems. The two groups of conductive strips overlap in certain zones. The application of voltages to a number of strips of each electrode system produces an electric field within the overlap zones, thereby giving rise to the light diffusion phenomenon which has been described earlier. By virtue of a judicious choice of the conductive strips to which suitable voltages are applied, a device of this type permits the appearance of characters which are thus displayed throughout the duration of the electric excitation. By suppressing the electric excitation, the displayed character is caused to disappear and the device is in readiness for the display of a further character.

In devices of the prior art, the electronic excitation circuits are necessarily located externally to these devices. For example, in order to supply a display unit having electrodes formed of metallic strips as described in the foregoing, recourse is had to selector circuits of the row and column type employed in the usual scanning techniques. Although their performance is satisfactory, these devices suffer from two main disadvantages:

Provision is made for a plurality of conductive strips in each electrode system and this accordingly entails the use of a plurality of output and input connections in order to excite the electrodes. These devices therefore contain a large number of connections and thus give rise to considerable constructional difficulties;

Since the electronic supply unit is necessarily located outside the device, the overall size of a system of this type is usually fairly substantial.

The present invention overcomes the above-mentioned disadvantages since a large part of the electrode excitation circuit can now be incorporated with the display device. Furthermore, provision is now made for a very small number of input and output connections in respect of each display device. Finally, the invention permits the use of alternating-current excitation which in many cases results in a considerable increase in the length of life of the liquid crystal employed. It has been possible to obtain such results in accordance with the invention by making use of the integrated-circuit technique.

More specifically the invention relates to an electro-optical device of the type comprising a film of liquid crystals located between two systems of electrodes, characterized in that one of said systems comprises on the one hand a supporting layer containing a plurality of integrated circuits and on the other hand a plurality of flat metallic electrodes deposited on said supporting layer, electrical connections being each intended to associate each electrode with one of the integrated circuits.

In a preferred form of construction, the second system of electrodes comprises an insulating and transparent plate which is provided on one face with a uniform coating of conductive and semi-transparent material.

In a preferred embodiment of the invention, said liquid crystals are of the nematic type.

In accordance with the invention, the electrodes of one of the systems are therefore not provided in the form of flat conductive strips but on the contrary in the form of a mosaic of small metallic rectangular elements which will be referred-to hereinafter as "pads." These pads are deposited directly on the integrated-circuit supporting layer by the conventional methods employed in the field of electronic microcircuitry. Each pad is connected to one of the integrated circuits by means of connections which are also deposited in accordance with the methods adopted in microcircuit technology. Each pad is thus associated with one electronic circuit which can be highly complex as is permitted by the integrated circuit technique. In particular and in accordance with one preferred embodiment of the invention, circuits can be constructed so as to form a shift register.

In accordance with the invention, the second system of electrodes is constructed in a very simple manner: a thin electrically conductive and semi-transparent coating is deposited on a transparent plate which may be of glass, for example. Said plate is placed parallel to the entire mosaic of pads and at a very short distance from these latter. The zones in which an electric field is applied or not are therefore those which are located between each pad which may or may not be excited and the semitransparent conductive coating which is located in oppositely-facing relation.

A clearer understanding of the invention will in any case be gained from the following description of one exemplified embodiment which is given by way of indication without any limitation being implied and reference will be made to the accompanying drawings, in which.

Figure 1:
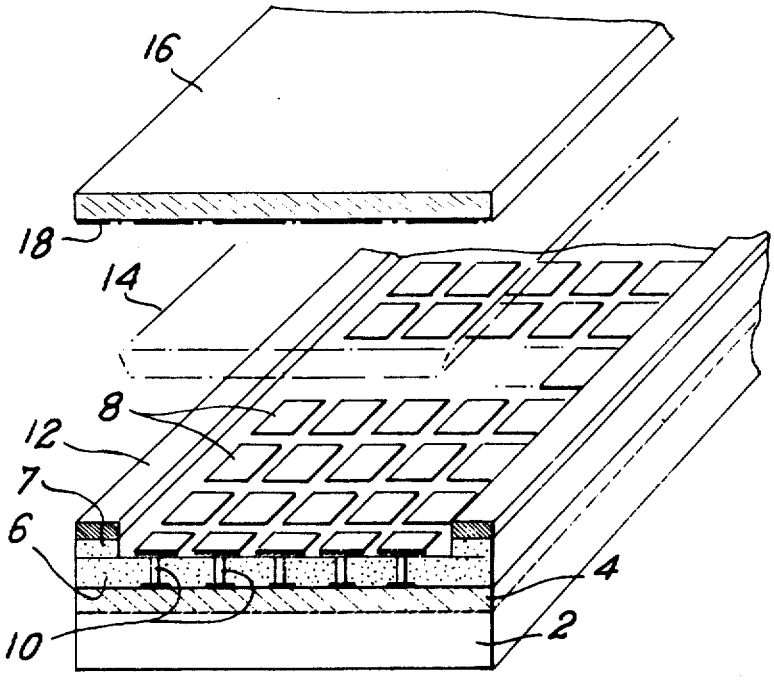
FIG. 1 is an exploded and partly cutaway view in perspective showing a device in accordance with the invention.

In FIG. 1, provision is made on the top face of a substrate 2 for a layer of integrated circuits 4 which are not shown in detail; provision is made on the top face of an insulating layer 6 for a plurality of meal plates or "pads" 8 forming electrodes which are joined to said integrated circuits by means of electrical connections 10; a second insulating layer 7 supports a metallic wall 12; a thin film of liquid crystals 14 is interposed between the plurality of electrodes 8 and a transparent insulating plate 16 which is provided on one face with an electrically conductive and semi-transparent coating 18; the plate 16 rests on the metallic wall 12 by means of its face 18.

In a more detailed manner, the top face of the substrate 2 which is usually formed of silicon carries a supporting layer 4. In accordance with a preferred alternative embodiment of the invention, provision is made for circuits which are formed from transistors of the metal-metal oxide-semiconductor type (MOS transistors) and which are integrated in said supporting layer 4. Said integrated circuits are of conventional type and neither the constructional design nor the properties of these latter need therefore be described. There is deposited on said circuit an insulating layer 6 consisting of a silica layer ($SiO_2$), for example, in which are subsequently formed passageways for the connections between the different integrated circuits of the supporting layer 4 and the future electrodes 8. The metallic electrodes 8 are preferably formed by deposition of metal on the insulating layer 6; the metallic layer which is thus obtained is then etched in order to form the mosaic of separate electrodes. A second silica layer 7 is deposited over all the electrodes thus formed. This second layer is covered with a thick metal layer. The insulating layer and the metal layer are then etched in order to expose the mosaic of pads 8 so that there remains at the periphery of the display unit only a metallic wall 12 which rests on an insulating base 7. The description of this wall will be resumed hereinafter with reference to FIG. 2. The plate 16 together with its conductive and semi-reflecting coating 18 is placed over the assembly which is thus formed so that the coating is located in oppositely-facing relation to the pads 8. The metallic wall 12 thus forms a packing strip while at the same time ensuring leak-tightness of the device. The liquid-crystal film 14 is then incorporated in the device by capillarity. The thickness of the liquid-crystal film is usually of the order of ten microns. The complete assembly is then sealed and placed within a mechanical support which can be of the type commonly employed in the integrated circuit technique.

The operation of a device of this type is as follows: during the stage of excitation by suitable electric signals, a voltage may or may not be applied to each pad 8 whilst the electrode 18 is at a given potential which may be ground potential, for example. If a voltage is not applied to any one pad 8, the crystal zone 14 which is contained between said pad and the electrode 18 is not subjected to any electric field; this zone is therefore transparent. On the contrary, if a voltage is applied to any one pad, the liquid-crystal zone which is located between said pad and the electrode 18 diffuses the light which is emitted by the auxiliary lamp. Since the support formed by the layers 4 and 6 is opaque by design, a device of this type usually operates by reflection: this means that the auxiliary light source which illuminates the panel is located in front of this latter, the observer being placed on the same side of the source with respect to the panel. The observer views the device and the light which he receives comes from the auxiliary illumination lamp which is not illustrated in FIG. 1. The light issuing from the lamp impinges on the pads 8 only if the liquid crystals are transparent at this point. In this case, since the incidence of the light-rays is oblique, and observation is made at a right angle, the observer does not receive any light-ray. Should this not be the case, the liquid crystals diffuse the incident light and the corresponding zones appear to be lit. Thus, in accordance with the invention, a pad which is subjected to a voltage and located in a zone in which the adjacent pads are not subjected to a voltage therefore appears as a white spot instead of a black zone. In the case of collective orientation, the device is illuminated through a polarizer and observation is made through a second crossed polarizer. Thus, in accordance with the invention, a pad which is subjected to a voltage appears with a certain color, which depends on the applied voltage. In this case one obtains a colored display device.

It has been found that the contrast obtained in the first case (display in black and white) and the color in the second case (colored display) are good with direct-current voltage of about 40 v. or alternating-current voltage of 15 v. These orders of magnitude of voltage are wholly compatible with the use of MOS transistors in accordance with the invention.

The response time of the device depends partly on the class of liquid crystals employed. In the case of nematic crystals, said response time is of the order of 1 millisecond. In the case of liquid crystals of the cholesteric class which are sensitive to an electric field, the response times are of much greater value since the viscosity of cholesteric liquid crystals is greater than that of nematic crystals. Although the invention is not limited to this class of liquid crystals, it is an advantage to make use of metoxybenzylidene butylaniline (MBBA), which is one of the most widely employed nematic liquid crystals since the temperature zone in which this material exhibits the properties of liquid crystals is in the vicinity of room temperature.

In one advantageous embodiment of the invention, the device has a rectangular shape such as that shown in FIG. 1. The different pads are arranged in n columns consisting of p lines so as to form a chequerboard pattern which, in the case of FIG. 1, comprises 5 columns made up of 7 lines, namely a total of 35 pads. This rectangular shape is convenient in the construction of units for the display of alphanumeric characters. The pads can have dimensions of the order of 300 microns by 300 microns and can be formed of aluminum. The dimensions of FIG. 1 are not to scale. From a study of FIG. 2, it is possible to gain an idea of the shape and respective sizes of the different elements.

Figures 2, 3:
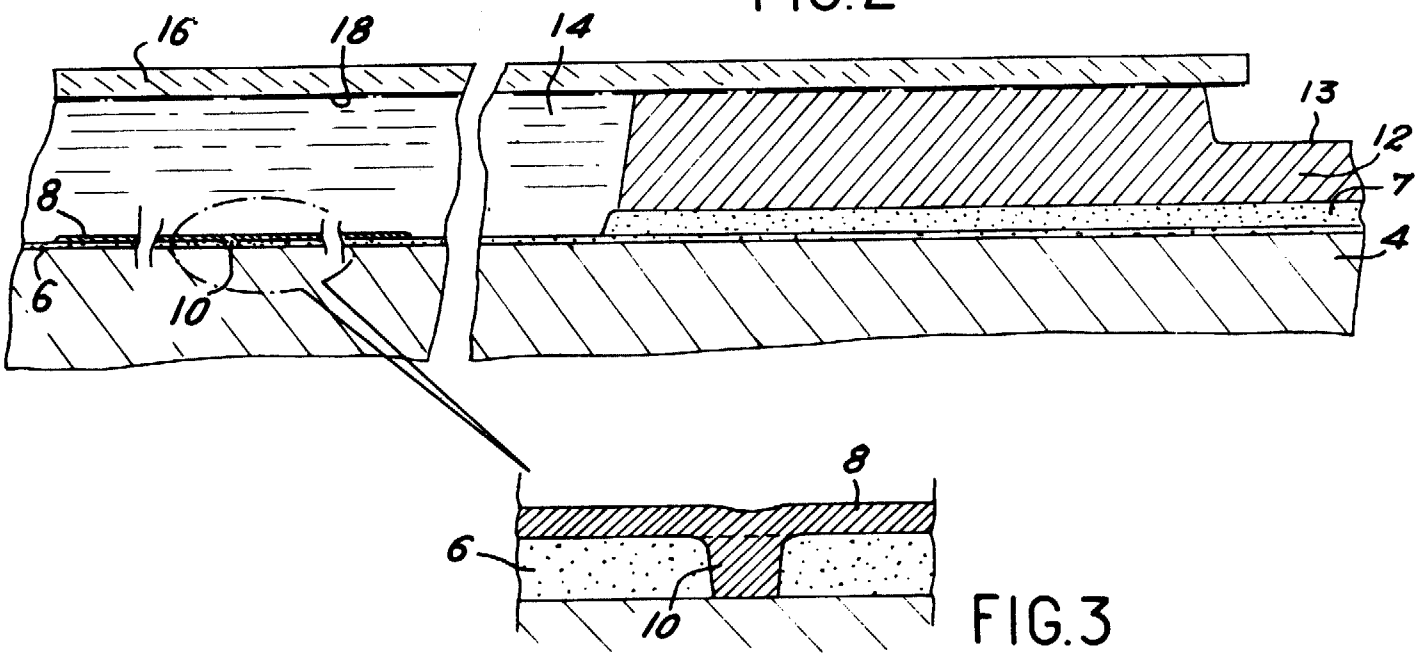
FIG. 2 is a sectional view of the device at the level of the lateral wall.
FIG. 3 is an enlarged view of a zone which is located in the vicinity of the center of a pad.

The sectional view of FIG. 2 shows certain constructional details of the device according to the invention, these details being drawn to scale. There can again be seen in FIG. 2 the integrated-circuit supporting layer 4, the layers 6 and 7 of insulating material, a metallic pad 8 and, in the right-hand portion of the figure, the metallic wall 12. The transparent plate 16 is supported on the top face of said wall by means of the semi-transparent and conductive coating 18. The thin liquid-crystal layer 14 is interposed between the coating 18 and the mosaic of pads 8. In this figure, a detail of the pad 8 appears within the chain-dotted outline and this latter shows the electrical connection 10 which connects the pad 8 to the integrated circuit contained in the supporting layer 4. In accordance with the invention, the wall 12 is formed of conductive material. In a preferred embodiment, said wall is formed of aluminum by vacuum evaporation.

The thickness of said wall is typically of the order of ten microns whilst the width is of the order of a few tens of microns (e.g. 50 microns). The wall 12 is extended by a surface 13 which provides a ready means of establishing an electrical connection to the conductive layer 18 of the plate 16. The metallic nature of the wall 12 makes it possible to obtain a homogeneous layer of uniform thickness: any other material such as silica, for example, does not reasult in the same quality. The design function of the wall 12 which is thus formed is threefold, namely to maintain leak-tightness of the display unit as a whole, to ensure a predetermined thickness of the crystal-liquid layer 14 by forming a packing strip, to provide an electrical connecton to the surface 18.

FIG. 3 is an enlarged view of the zone which is surrounded by a circle in FIG. 2 and corresponds to the central porton of a pad 8. There are again shown in cross-section in this figure the insulating layer 6, a portion of a pad 8 and the electrical connection 10.

Figure 4:
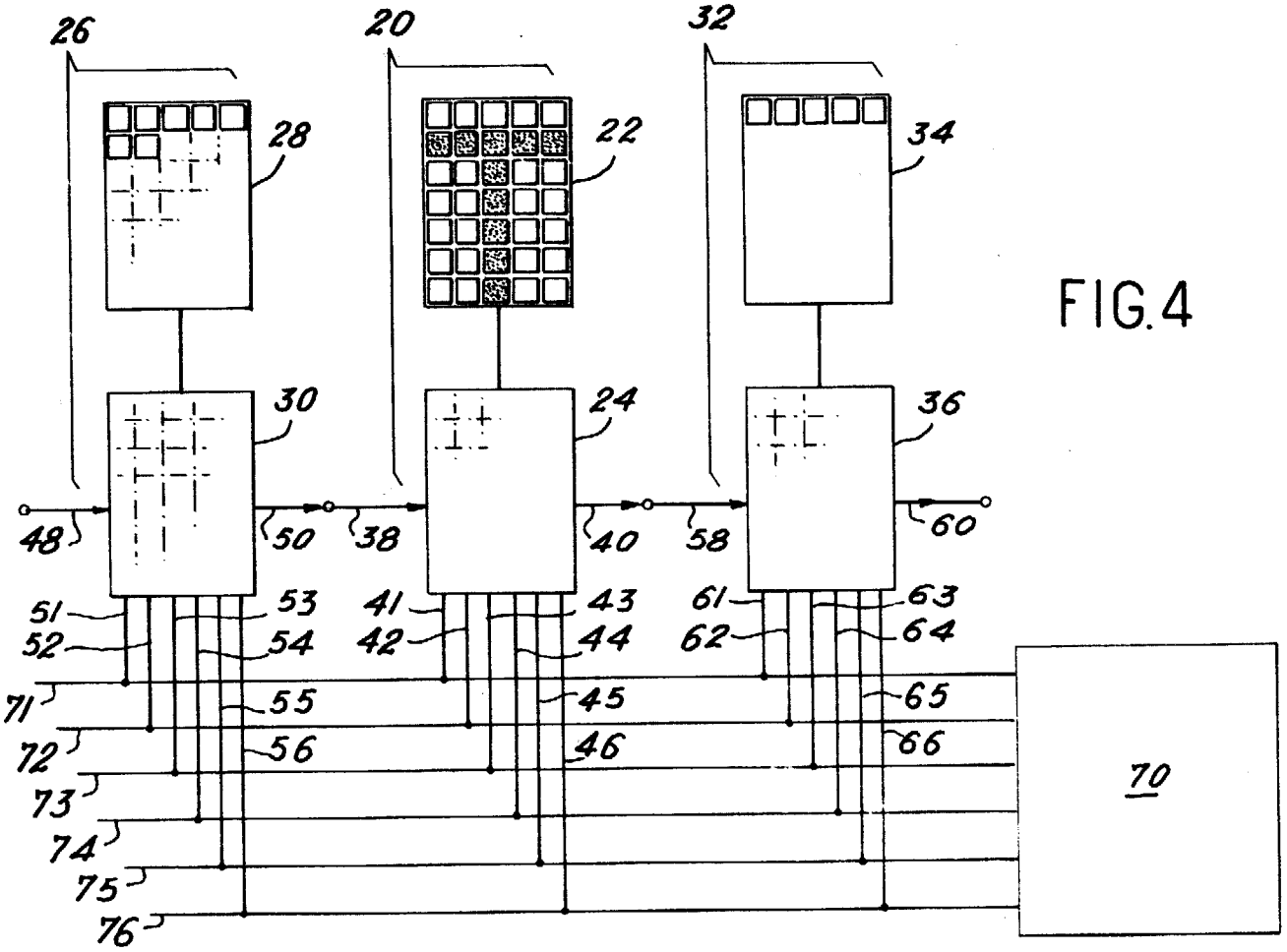
FIG. 4 is a diagrammatic view shown one example of a system of connection which permits excitation of three display units.

In FIG. 4, there is shown a diagram of connection of three display units which are designed in accordance with the invention. By display unit is meant the mounted assembly of elements as illustrated in FIG. 1, this assembly being capable of displaying an alphanumeric character. Although in an actual unit the integrated circuits are in fact very close to the mosaic of electrodes as has been explained in connecton with FIG. 1, the two functions of electrical excitation and display have been separated in FIG. 4 for the sake of enhanced clarity. Thus, the unit 20 shown in FIG. 4 comprises the display zone 22 proper and the assembly 24 of excitation circuits. The display zone which is illustrated corresponds to the previous example of 5 columns comprising 7 lines of pads. It has been assumed that the unit 20 displays the letter T. A second unit 26 which is identical with the unit 20 comprises the display zone 28 proper in which only a few pads are illustrated, said zone being associated with the assembly of integrated circuits 30. Similarly, a third unit 32 which is identical with the two previous units comprises the display zone 34, only a few pads of which are shown and the circuit 36. It is assumed that each circuit assembly 24, 30 and 36 is so designed that the plurality of integrated circuits which make up said assembly form a shift register of a type which is known by those who are versed in the art.

Each circuit assembly comprises eight connections. Thus, the circuit assembly 24 comprises one input connection 38, one output connection 40 and six connections 41, 42, 43, 44, 45 and 46; the circuit assembly 30 comprises one input connection 48, one output connection 50 and six connections 51, 52, 53, 54, 55 and 56; similarly, the circuit assembly 36 comprises one input connection 58, one output connection 60 and the six connections 61, 62, 63, 64, 65 and 66. The supply unit 70 has six output connections 71, 72, 73, 74, 75 and 76 to which are connected in parallel the three abovementioned sets of six connections which supply the circuit assemblies 24, 30 and 36.

The principle of interconnection of said circuit assemblies is as follows:

The supply unit 70 which is not shown in detail permits the excitation of the shift registers which are formed by the integrated circuits corresponding to each display unit. Said shift registers are supplied in known manner by means of six connections leading from the supply unit 70. Said connections comprise one ground connection 71, two voltage connections 72 and 73, one alternating-current voltage connection 74 and two connections 75 and 76 for producing shift pulses which are derived from electronic clocks. Depending ın the mode of operation which is chosen, each circuit ssembly 24, 30 and 36 therefore receives either a lirect-current voltage or an alternating-current voltage ı addition to the different signals derived from the locks contained in the supply unit 70. By means of the abrication technique which has been described with eference to FIGS. 1 and 2 especially by virtue of the resence of an electrical connection 13 which is readily ccessible at the level of the wall surrounding each isplay unit, the units 20 and 32 can be readily conected in series by means of the connections 40 and 58. imilarly, the display units 20 and 26 can be connected ı series by means of the connections 38 and 50. Thus, respective of the number of display units (three in IG. 4), the number of connections which are necesary for the supply of electric current to said display nits is always eight as shown in the arrangement emloyed in FIG. 4. It is therefore apparent that, in conast to the devices of the prior art, the display device in ccordance with the invention makes it possible to mploy an electronic circuit of very simple design.

It is obvious that the use of electronic circuits which ɔrm a shift register has been given only by way of xplanation. Thus it follows that other forms of interated circuits which are associated with each pad and hich would have different functions could readily be evised by any one skilled in the art without thereby eparting from the scope of the invention.

The simplification of the electronic circuits comined with the integration of a large part of these latter ıakes it possible to construct electrooptical devices in hich the dissipated power per display unit is of very ɔw value. Thus, the devices as hereinabove described all for an input power of approximately 1 milliwatt per ad. This very low power which is dissipated in the evice makes it possible to maintain the device as a hole at a temperature corresponding to the temperaıre zone which is suited to the liquid crystal employed.

is further apparent from the diagram of FIG. 4 that, y means of the device in accordance with the invenon, the display units can very readily be excited by ıeans of alternating-current signals. In consequence, ıe service life of the device is considerably longer in ıis case than the life-time which is obtained with sigals of constant polarity. For example, the service life an be increased from 600 hours (with direct-current ccitation) to several thousand hours (with alternatingırrent excitation).

What we claim is:

[1. An electrooptical device of the type comprising film of liquid crystals located between two systems of ectrodes, wherein one of said systems comprises a ıpporting layer having a plurality of integrated circuits ounted on one side and a plurality of flat metallic ectrodes deposited on the other side of said supportıg layer, electrical connections through said supporting layer to connect each electrode with one of said circuits.]

[2. A device in accordance with claim 1, wherein the second system of electrodes aforesaid comprises an insulating and transparent plate which is provided on one face with a uniform coating of conductive and semi-transparent material.]

3. [ A device in accordance with claim 2,] *An electrooptical device of the type comprising a film of liquid crystals located between two systems of electrodes, wherein one of said systems comprises a supporting layer having a plurality of integrated circuits mounted on one side and a plurality of flat metallic electrodes deposited on the other side of said supporting layer, electrical connections through said supporting layer to connect each electrode with one of said circuits, wherein the second system of electrodes aforesaid comprises an insulating and transparent plate which is provided on one face with a uniform coating of conductive and semi-transparent material,* wherein said plate rests by means of its coated face on a metallic wall which is deposited at the periphery of said integrated-circuit supporting layer, the design function of said wall being to ensure leak-tightness of the device as well as optimum thickness of liquid crystals and an electrical connection to said coated face.

[4. A device in accordance with claim 1, wherein said liquid crystals are of the nematic type.]

[5. A device in accordance with claim 1, wherein said integrated circuits are constituted by transistor assemblies of the "metal-metal oxide-semiconductor" type.]

[6. A device in accordance with claim 5, wherein said integrated circuits form an electronic system of the shift register type.]

[7. A device in accordance with claim 1, wherein said integrated circuits and said electrodes are disposed in a rectangular panel consisting of n columns having p lines.]

[8. A device in accordance with claim 1, wherein illumination and observation of said device are made through crossed polarisers to obtain a colored display.]

*9. An electrooptical device of the type comprising a film of liquid crystals located between a first insulating and transparent plate which is provided on one face with a uniform coating of conductive and semi-transparent material and a second plate which is provided on one face with a system of electrodes adapted for connection to electrode excitation circuits wherein said first plate rests by means of its coated face on a metallic wall which is deposited at the periphery of said second plate, the design function of said wall being to ensure leak-tightness of the device as well as optimum thickness of liquid crystals and an electrical connection to said first plate coated face.*

* * * * *